June 27, 1950    H. F. MUENCHOW    2,512,870
OVEN ASSEMBLY FOR COOKING RANGES
Filed May 11, 1946    2 Sheets-Sheet 1

*INVENTOR.*
HENRY F. MUENCHOW.
BY
*ATTORNEY*

INVENTOR.
HENRY F. MUENCHOW.
BY S. J. Coo.
ATTORNEY.

Patented June 27, 1950

2,512,870

UNITED STATES PATENT OFFICE 2,512,870

OVEN ASSEMBLY FOR COOKING RANGES

Henry F. Muenchow, Milwaukee, Wis., assignor to A. J. Lindemann & Hoverson Company, Milwaukee, Wis., a corporation of Wisconsin Application May 11, 1946, Serial No. 669,200

3 Claims. (Cl. 126—19)

The improvements relate to gas, electric and other food cooking ovens, made chiefly of sheet metal and usually enameled on their interior and exterior surfaces which are exposed to view and to contact with the human hands, food and other contaminating agencies and require cleaning from time to time. They are usable, however, in other and analogous structures in which they may be used or to which they may be adapted.

Among the objects of the improvements are the provision of a method and means whereby the inner oven may be made up complete, enameled and then inserted and secured in the outer shell or frame of the range in an effective, efficient and labor saving manner, and will be strong, securely sealed and its parts united firmly to form a unitary structure. Other objects and advantages will appear from the following description and the accompanying drawings.

Heretofore it has been the practice to pass the topless and bottomless oven compartment into the outer oven shell or frame through the flanged front oven opening of the latter, which is made of such size as to receive it rather snugly and is surrounded by laterally extending flanges adapted to be overlapped on the front outer side by the laterally extending flanges of the said inner oven, then weld or otherwise secure the upwardly extending top or cover and bottom of this inner oven thereon, by working through the top of the said outer shell or frame and the interior of the said inner oven. This is a rather awkward and labor wasting operation, and sometimes results in unsatisfactory joining of the inner oven and its raised top and bottom, but has been found necessary heretofore because the said top and bottom usually and necessarily cannot be passed through the front of the outer oven frame if the bottom or the top is first mounted thereon, on account of the limited dimensions of the opening, which must be less than that of the front flanges of the oven so that they extend beyond and overlap it to make a tight joint.

With the present improvements the inner oven is first assembled complete with its top and enameled on its interior, and before inserting it in the outer oven shell of the range, then passed into said outer shell downwardly through the open top of the latter in a direction diagonal to the vertical front of the oven shell, its front flanges passing through openings at the top of the front side flanges of said outer shell, until the top and side flanges of the inner oven have passed entirely through said openings and the inner oven with its top is entirely below the top of the outer shell and projects partly beyond it at the front. The inner oven is then raised and turned to vertical position, to bring its front, side and bottom flanges opposite the said shell flanges on their outer or front side, then drawn inwardly and backwardly until the flanges are in close contact, except at the flange openings referred to, and the inner oven then secured in position by bolts or the like at the rear. Spring sheet metal wedges are then inserted at the flange openings to engage the adjacent edges of said openings and to cover and close the openings securely and tightly. The top or cover of the outer shell is then mounted thereon and secured in position. This, as will be seen, provides for an expeditious assembly of the oven and range and also enables the maker to complete the oven before installation and under conditions calculated to produce a cooking compartment without flaws or distortion of its parts, and with the expenditure of a minimum of labor and overhead.

Figure 1:
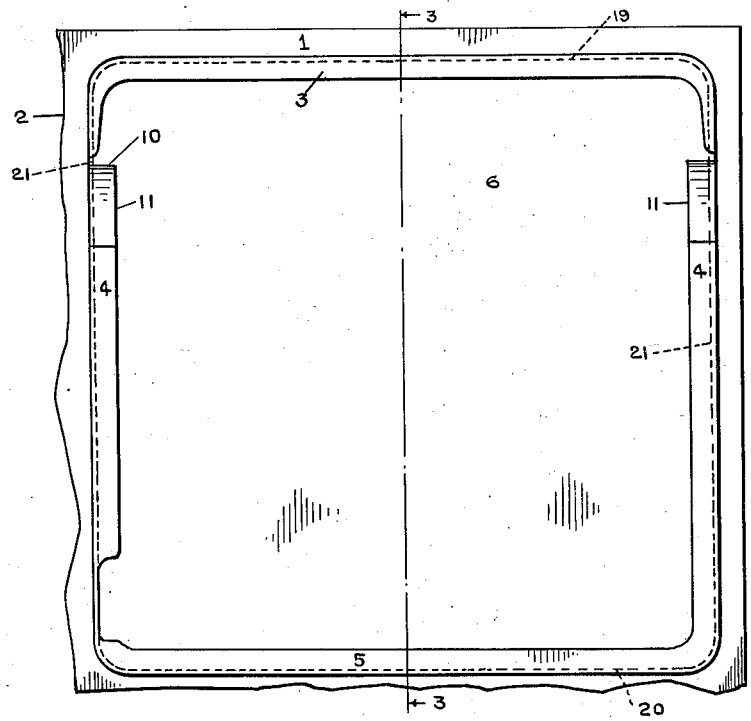
Fig. 1 is a front elevation of the outer range frame alone of the oven according to the present improvements, with the position of the front flange of the oven thereon indicated in dotted lines.

The front of the outer shell or frame 1 for the oven is of usual construction and consists essentially of a front 2 having a stepped-back inwardly projecting flange comprising top 3, sides 4 and bottom 5 around its front door opening 6. It also has a bottom 7 and a top 8, with flue opening 8', the latter being secured thereto after the oven compartment has been inserted through its open top at 9. These parts of the shell or frame are bolted or otherwise secured together to form a rigid structure, including the back 24.

Near their tops the side flanges 4 are cut or slitted horizontally at points on the same level and on opposite sides, as shown at 10 and the sheet metal of the flange for a short distance below the slit drawn back on an upwardly flaring line as shown at 11 but having a portion of the drawn metal 12 as a web to connect the laterally extending portion of the flange with the base from which it is drawn and strengthen it, so that it will remain in proper position while acting as a guide for the expeditious assembly of the oven and range and also enables the maker to complete the oven before installation and under conditions calculated to produce a cooking compartment without flaws or distortion of its parts, and with the expenditure of a minimum of labor and overhead.

The oven compartment 13 comprises the top 15 and its upwardly extending or recessed part 14, the latter having a flue vent 16 leading to the flue opening 8', the recessed bottom 17, back 18 and front flanges 19, 20, and 21 around the front or door opening.

This oven compartment or inner oven is assembled complete outside the range by shaping its parts and securing them together by bolts, rivets, welds or other means. It can also be enameled after assemblage and the enameled lining inspected and tested if desired before being inserted in the outer oven framework. This is a great advantage, economizes labor and overhead and produces better and more uniform results. It also insures against damage to the oven and frame sometimes caused by the work on the oven involved in applying and securing its top. The frame of the oven is also enameled on its exposed exterior and this enamel is easily damaged by tools used in working on the oven. To enamel the oven and top after they have been positioned in the frame is quite infeasible.

The recessed oven top is a practical necessity as the rising vapor smoke and combustion products in the oven must be collected in the recess and directed toward the flue. The recess must also be above the body of the oven and above the door opening to guard against the escape of the heated smoke, vapors and gases when the door is opened during cooking operations, and this makes it necessary that the oven shall be of greater height than the door opening of the frame. It is also best to locate the broiler burner in this recess. The recessed oven bottom must also extend below the door to give the best results, and this adds further to the relative vertical dimension of the oven with respect to the frame door opening, making it necessary if the oven is to be inserted through the said opening to apply the bottom after insertion.

The strips of metal 22 which are inserted in the aperture between the turn back portions 11 and the backs of the front oven flanges 21 are preferably of resilient metal and have a looped portion 22' at their upper ends which is compressed when these members are forced home and will have a wedging action which will hold the said members in position and securely close the aperture at 10.

Figure 2:
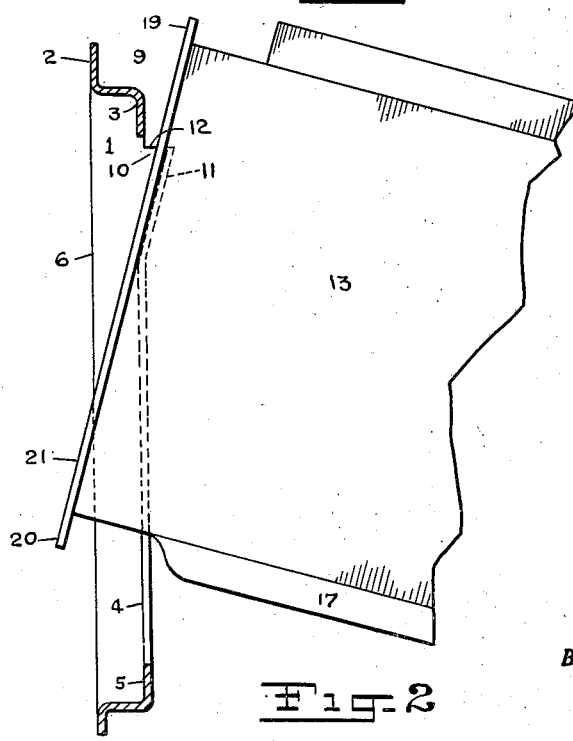
Fig. 2 is a side elevation of the front portion of the oven broken away, during the operation of inserting it in the outer frame, with the front outer frame shown in vertical section and a portion of its flange in dotted lines.
Figure 3:
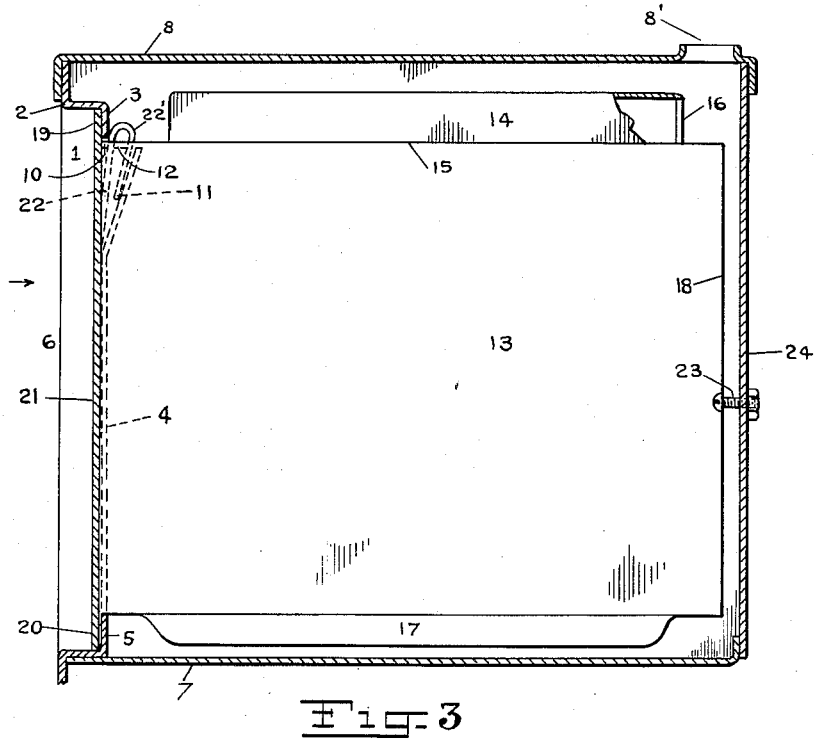
Fig. 3 is a longitudinal vertical section of the oven frame on line 3—3 of Fig. 1 with oven, in side elevation, positioned therein.
Figure 4:
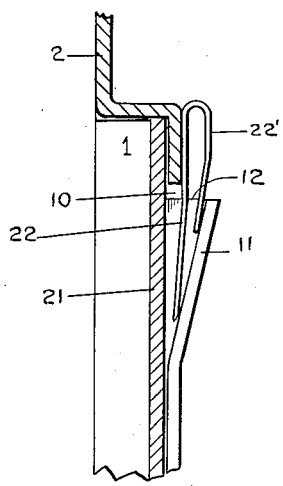
Fig. 4 is an enlarged detail of portions of the oven front flange and outer front frame with the aperture-closing wedge therein.

In operation and in the practice of the method of this invention, the side flanges of the frame are slitted and drawn back near their upper ends and the oven, which has been assembled and finished as a complete unit, is then lowered through the open top of the said frame in oblique or tilted relation to said frame front (Fig. 2) while its front flanges are passed through the openings of the said frame flanges, bottom first, and are guided there through by the drawn back portions 11, until the said oven flanges have passed entirely through the frame flanges and are on the outside thereof. In this operation, the oven unit body is passed into the oven frame and reaches a position entirely within the same and below the top of the frame. The oven is now turned to its normal vertical position and moved upwardly and inwardly until the flanges are in coincidence and in contact with the flanges of the frame and overlap the latter on the outside. The oven is then secured in position and connected with its frame, preferably by means of the bolt 23 passing through the backs 18 and 24. Next, the looped metal strip 22, 22' is forced into position in the aperture between the turned back portions 11 and the back of the oven flanges 21 closing the opening 10. After this has been done, the top 8 of the frame is placed in position and secured and the structure is complete.

The details of construction of the exemplary embodiment herein described and shown may be varied within certain limits and the steps of the process described and claimed may be changed or modified to some extent without departing from the scope of the improvements.

What I claim is:

1. In a device of the character indicated, an oven compartment preformed before insertion in its frame as a complete unit and comprising top, bottom, sides, back and having an open front, laterally and outwardly extending flanges at the edges of said open front, a frame comprising top and closed bottom, sides and rear end in which said compartment is positioned in closely spaced relation having a front opening of lesser height than the height of the oven compartment, laterally and inwardly extending flanges at the edges of said frame front opening overlapped on their outer sides by and in contact with said compartment flanges, said frame flanges having apertures near the top of the frame on opposite sides thereof through which said side compartment flanges are adapted to be passed simultaneously to their position outside the said frame flanges when assembled, there being upwardly and inwardly flared portions of said flanges adjacent and leading to said apertures, said oven compartment being of such size as to be non-insertable and non-removable through said frame front opening.

2. In a device of the character indicated, an oven compartment preformed before insertion in its frame as a complete unit and comprising top, bottom, sides, back and having an open front, laterally extending flanges at the edges of said open front, a frame comprising top and closed bottom, sides and rear end in which said compartment is positioned in closely spaced relation having a front opening of lesser height than the height of the oven compartment, laterally extending flanges at the edges of said frame front opening overlapped on their outer sides by and in contact with said compartment flanges, said frame flanges having apertures near the top of the frame on opposite sides thereof through which said side compartment flanges are adapted to be passed simultaneously to their position outside the said frame flanges when assembled, said oven compartment being of such size as to be non-insertable and non-removable through said frame front opening, and metal strips mounted in said apertures and substantially lapping the compartment flanges opposite the same.

3. In a device of the character indicated, an oven compartment preformed before insertion in its frame as a complete unit and comprising top, bottom, sides and back having an open front, laterally extending flanges at the edges of said open front, a frame comprising top, bottom, sides and rear end in which said compartment is positioned having a front opening of lesser height than the height of the oven compartment, laterally extending flanges at the edges of said frame front opening overlapped on their outer sides by and in contact with said compartment flanges, said frame flanges having apertures near the top of the frame on opposite sides thereof through which said compartment flanges are adapted to be passed to their position outside the said frame flanges when assembled, there being inwardly turned and upwardly flaring portions of said frame flanges at said apertures, said oven compartment being of such size as to be non-insertable and non-removable through said frame front opening, and downwardly tapering spring metal members in said apertures substantially lapping the compartment flanges opposite the same and wedged in between them and the inwardly turned portions of the frame flanges.

HENRY F. MUENCHOW.

REFERENCES CITED

The following references are of record in the file of this patent:

UNITED STATES PATENTS

| Number | Name | Date |
|---|---|---|
| 284,030 | Lewis | Aug. 28, 1883 |
| 1,116,831 | Meyers | Nov. 10, 1914 |
| 1,492,909 | Wazenegger | May 6, 1924 |
| 1,580,106 | Allie | Apr. 13, 1926 |
| 1,586,158 | MacInnes | May 25, 1926 |
| 1,713,308 | Tinnerman | May 14, 1929 |
| 2,077,777 | Stanley | Apr. 20, 1937 |
| 2,078,840 | Dorl et al. | Apr. 27, 1937 |
| 2,273,998 | Rueger | Feb. 24, 1942 |
| 2,393,879 | Barnsteiner | Jan. 29, 1946 |
| 2,416,132 | Watson | Feb. 18, 1947 |